Feb. 17, 1931.  E. B. CARNS  1,792,890
AIRPLANE
Original Filed July 21, 1927
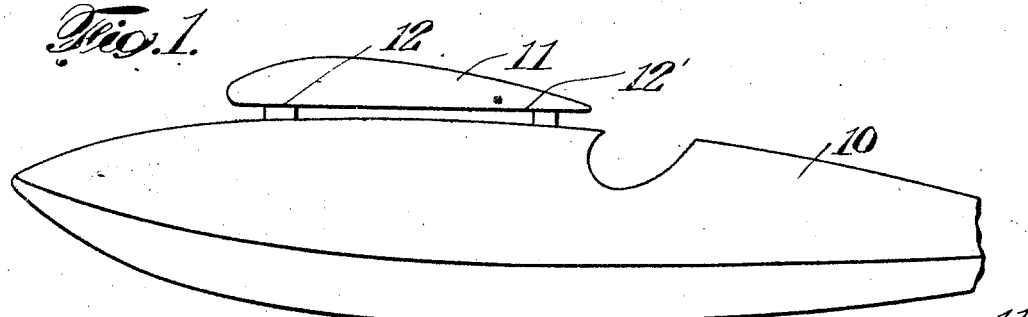
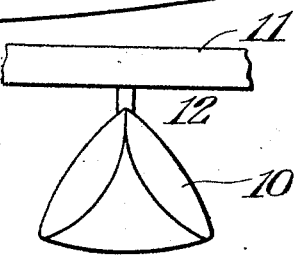
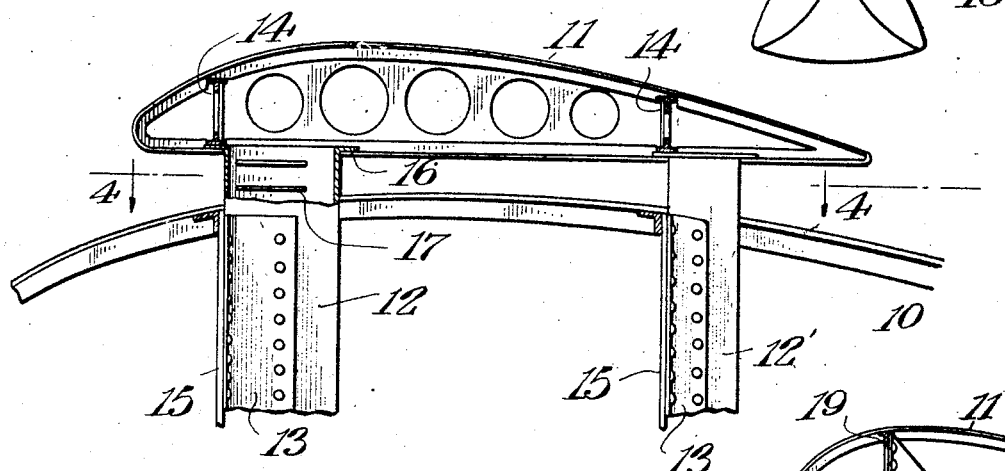
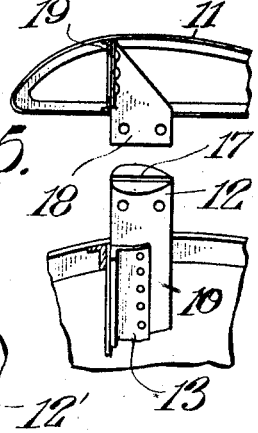
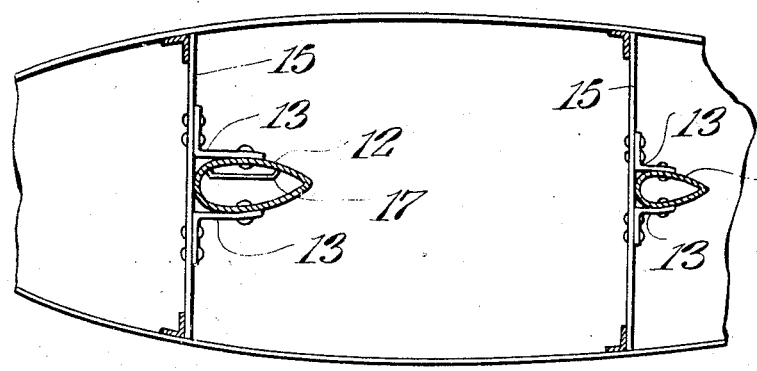
Inventor,
Edmund B. Carns,
By his Attorneys,
Hoguet & Neary.

Patented Feb. 17, 1931

1,792,890

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

AIRPLANE

Application filed July 21, 1927, Serial No. 207,344. Renewed June 1, 1929.

My invention relates to improvements in airplanes and the object of my invention is to produce an airplane having improved buoyancy or lifting power in proportion to its wing spread, better visibility for the pilot and occupants of the plane, easier means of access to the wing from the fuselage and which offers less air resistance in proportion to its size than do the conventional machines. My invention does not relate to the details of construction of the plane or fuselage, although the general type of fuselage is I believe novel. Where the fuselage is fastened at the top the under side of the wing beam, it is obvious that the lifting power of the wing immediately over the fuselage is lost, and furthermore the close connection for a comparatively wide space between the wing and fuselage offers obstruction to the vision of the occupants of the fuselage. I have found that by spacing the fuselage from the wing and connecting the two by hanger struts or connecting elements, preferably of stream line contour and narrow in cross section, clearance and observation are much improved and this middle portion of the wing is useful for lifting purposes, thus increasing the lifting power of the wing. I have found further that by reducing the fuselage or narrowing it as it approaches the top, this effect is enhanced and the fuselage itself offers less air resistance and if the side walls of the fuselage are made with proper curves the fuselage is very strong. Also in carrying out this idea I can utilize at least one of the hanging elements as a means of access to the wing from the fuselage. These and other advantages will appear from the description and drawings.

Reference is to be had to the accompanying drawings in which similar reference characters represent the corresponding parts in all views.

Figure 1 is a broken side elevation of an airplane showing my improvements.

Figure 2 is a broken end view of the machine.

Figure 3 is an enlarged detail longitudinal section showing some of the parts in elevation.

Figure 4 is a sectional plane view on the line 4—4 of Figure 3, and

Figure 5 is a broken detail showing a modified means of connecting the wing and fuselage.

The fuselage 10 may in detail be of any approved character, although I prefer to make it of generally triangular cross section and with the sides forming compound curves, that is, with cross sectional and longitudinal curves of different radii so that the curves of the plate will intersect at all points and thus place the fibers of the plane plates under tension and greatly strengthen them.

This generally triangular shape with the apex of the triangle uppermost leaves the wing 11 with substantially its whole underbody useful for buoyancy purposes and the shape of the fuselage and the narrow connection with the wing make for better visibility by the occupants of the fuselage.

The wing 11 may be of any approved kind and the wing and fuselage connect by tubular hanger elements or struts 12 and 12'. These may connect with the two parts in any approved way but as illustrated the connection with the fuselage is by means of angles 13 which are fastened to the hanger struts and to bulkheads 15 or the like in the fuselage. The upper ends of the hanger struts can be flanged as shown at 16 to connect with the wing and the struts as shown come beneath the wing spar members 14. The elements 12 and 12' are as stated tubular and of stream line section and at least one of them is large enough to permit a person to pass through it from the fuselage to the wing. To this end I have shown the forward strut provided with a ladder 17 so that a person can pass readily from the fuselage to the wing. If the ladder is placed sidewise in the strut it will occupy but little room and the strut does not need to be excessively large to permit a person to pass through it. Obviously there may be as many of these struts 12 and 12' as may be necessary and in a large plane more than one might be provided with means of access between the fuselage and wing but in a moderate size plane the forward strut can be large enough for this purpose and it is unnecessary to have the after strut so large. The means of connection between the parts is shown by way of example and Figure 5 illustrates another means of connection in which the strut 12 is adapted to connect with the complementary member 18 which is fastened to the spar 19 of the wing 11. This illustrates the fact that the connection can be in many ways without affecting the invention.

From the foregoing description it will be seen that the machine is simple in structure, that substantially the whole middle portion of the wing 11 comes into efficient lifting contact with the air, that the fuselage can be made strong but light, that almost perfect visibility is obtained by the construction described, and that a simple and safe means is provided whereby a person can pass between the fuselage and the wing.

It will also be noticed that by having the fuselage noticeably narrowed at the top, and by connecting the narrowest part of the fuselage with the wing through the strut elements 12 and 12', the lifting power of the wing and the visibility from the fuselage are especially improved, and it will also be seen that by having the tubular strut elements arranged in fore and aft alignment, they offer but little more air resistance than will a single element.

I claim:

1. An air plane comprising a fuselage noticeably narrowed at the top, a wing spaced apart above the fuselage, a tubular strut element connecting the narrowest part of the fuselage with the wing, and a ladder in the strut element.

2. An air plane comprising a fuselage noticeably narrowed at the top, a wing spaced apart from the top of the fuselage, and a plurality of hollow strut elements in fore and aft alignment and connecting the wing and the said narrow top of the fuselage at least one of said strut elements serving as a companion way.

3. In a monoplane the combination of a fuselage, a continuous wing beam spaced apart above the fuselage, and a two part tubular strut rigidly connecting the wing and fuselage, one part of said strut being attached to the wing, the other part to the fuselage, and the two parts being complementary and united.

4. In combination a fuselage, a continuous wing beam spaced apart above a fuselage narrow at the top, a vertical strut element rigidly connecting the wing beam and the narrow top of said fuselage.

5. In combination a fuselage narrow at the top, a continuous wing beam spaced apart above the fuselage, a plurality of strut elements substantially vertical in a longitudinal plane in fore and aft alignment and rigidly connecting the wing and narrow top of the fuselage.

6. In combination a fuselage narrow at the top, a continuous wing beam spaced apart above the fuselage, a plurality of tubular strut elements substantially vertical in longitudinal plane in fore and aft alignment and rigidly connecting the wing and the narrow top of the fuselage.

In testimony whereof, I have signed my name to this specification this 18th day of July, 1927.

EDMUND B. CARNS.